Patented Jan. 10, 1933

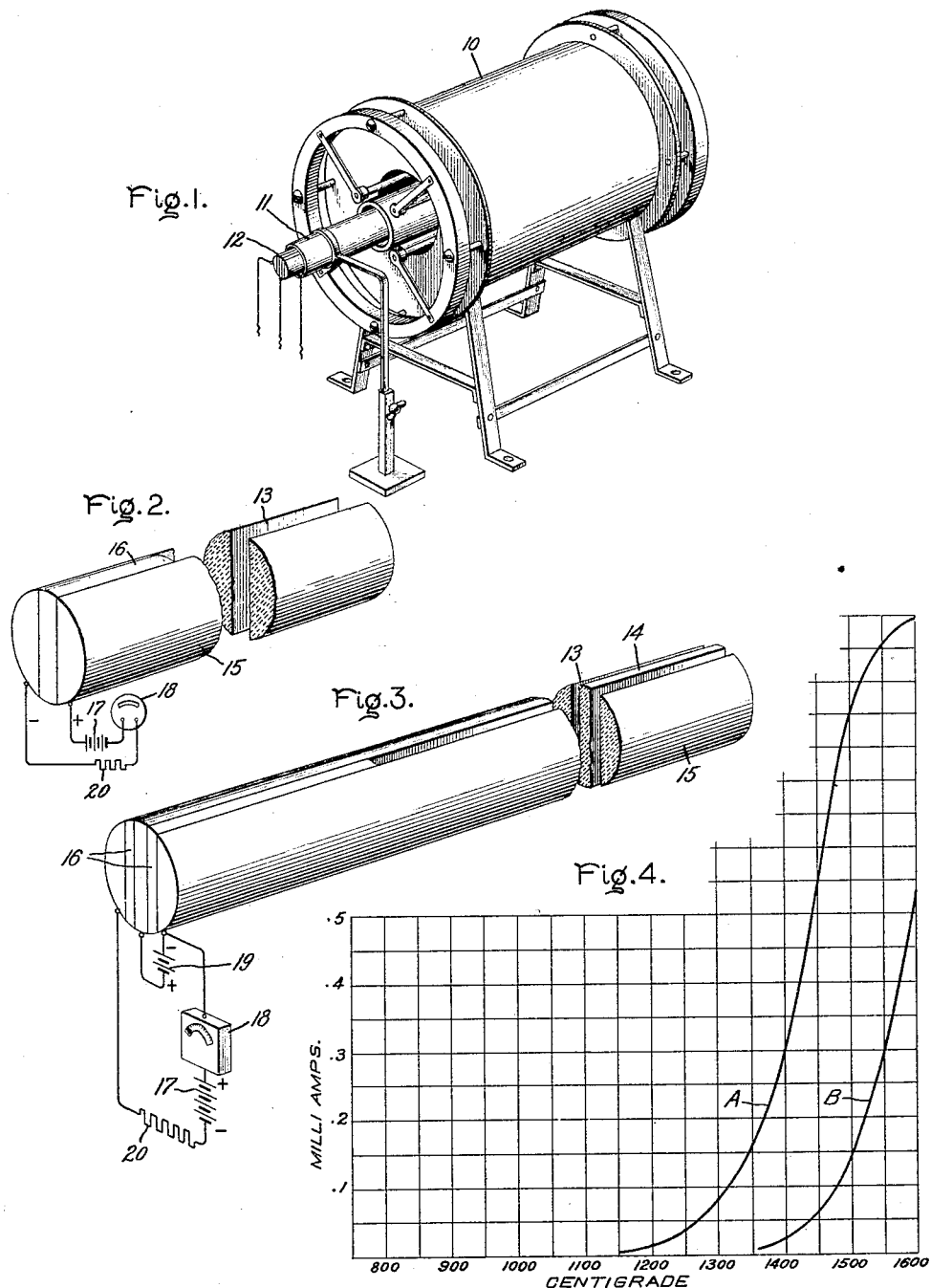

1,894,110

UNITED STATES PATENT OFFICE

FREDRICK S. MARCELLUS, OF SCOTIA, NEW YORK, ASSIGNOR TO GENERAL ELECTRIC COMPANY, A CORPORATION OF NEW YORK

TEMPERATURE MEASUREMENT

Application filed November 28, 1930. Serial No. 498,772.

My invention relates to apparatus for measuring high temperatures such as occur in furnaces and its object is to provide inexpensive reliable apparatus of the class described. In carrying my invention into effect I make use of the principle of a change in ionization with change in temperature in a manner which has some analogy to the ionization which occurs when a filament in a vacuum tube is heated. However I have found that a vacuum is unnecessary and that ionization will occur in air at high temperature so as to make the air between heated electrodes conducting and that the phenomenon varies with temperature so that the same may be utilized for temperature measurements.

The features of my invention which are believed to be novel and patentable will be pointed out in the claims appended hereto. For a better understanding of my invention reference is made in the following description to the accompanying drawing Fig. 1 of which represents my invention as I have used it to measure the temperature in an electric furnace; Fig. 2 represents a portion of a two-electrode temperature responsive element; Fig. 3 represents a three-electrode temperature responsive element and the circuit connections therefor, and Fig. 4 shows temperature current curves which I have obtained with such apparatus.

In Fig. 1 I have represented at 10 a small furnace of a type commonly used in laboratories. A tube 11 extends into the interior of the furnace and one of my temperature responsive elements 12 is inserted into this tube so as to bring its inner end into the region where the temperature is to be measured. The outer end is provided with electric terminals for connection to a source of supply and a measuring instrument which measures the degree of ionization between the electrodes of the element 12 and may be calibrated in temperature units.

Fig. 2 represents a two-electrode element, and Fig. 3 represents a three-electrode element such as is represented at 12 in Fig. 1. These elements are made up of two or more electrodes 13, 14 and 15 held in spaced relation by spacers of insulating material 16 at the outer or cold end of the unit.

The electrodes are made of some material capable of withstanding high temperatures which is also a conductor of electricity, but not necessarily what is usually considered a good conductor. I have used silicon carbide rods for the electrodes 13, 14 and 15. Such material will withstand high temperatures without warping or disintegration. The insulating spacers 16 between the electrodes may be made of glass, alundum or any other suitable insulating material which will not be injured by heating. The end of the element where the insulation spacers are provided is not exposed to the high temperature but may become quite hot due to conduction of heat along the electrodes. The cylindrical shape of the units shown is not essential but is convenient for inserting into circular openings in the manner represented in Fig. 1.

It will be noted that adjacent electrodes are separated at their inner ends by a narrow air space and that relatively large flat surfaces face each other across such air space. If now I connect a source of supply 17 and a sensitive measuring instrument 18 across the electrodes 13, 15 as represented in Fig. 2 no current will flow in the circuit under ordinary temperature conditions. However if the right hand end of the element is heated to a temperature in excess of about 1200 degrees C. ionization of the air between the electrodes occurs to a greater or less extent, depending on the temperature, and becomes correspondingly conductive and allows current to flow in the circuit which can be measured on the instrument 18. The temperature-current characteristics of such a device is shown in curve A of Fig. 4 where it will be noted that between about 1300 and 1600 degrees C. the current varies with the temperature in such a way that the instrument may be calibrated with the apparatus in temperature units. The device of Fig. 1 saturates in the vicinity of about 1600 degrees C. and it is evident that an increase of temperature much beyond this will not produce any appreciable change in current.

For temperatures in excess of 1600 degrees

C. the arrangement shown in Fig. 3 may be used. Here there are three spaced electrodes and the middle electrode 14 is used in a manner analogous to the control grid in a three-electrode vacuum tube. The battery 17 and instrument 18 correspond to those represented in Fig. 2 and are connected in series across the two outer electrodes 13, 15. The middle electrode 14 is biased by a battery 19 so as to have a positive voltage with respect to electrode 13, the latter being connected to the negative side of source 17 as represented by the polarity indications. This device has a temperature-current curve over a higher range of temperature than the device of Fig. 2. The lower portion of the curve for the device of Fig. 3 is represented by curve B and my experiments indicate that the useful range of this modification is from about 1450 to about 2000 degrees C., a range over which a practicable temperature measuring and indicating device has been very much needed. In each of the circuits I have shown a resistance 20 which is useful for calibrating and for limiting the current to a low value. The apparatus may of course be used for temperature control purposes as well as for temperature indication. The air gaps between the electrodes may be conveniently termed an ionization air gap to indicate that it is such a gap as will become conductive to pass current between the electrodes by reason of ionization when heated to the necessary temperature.

In accordance with the provisions of the patent statutes I have described the principle of operation of my invention, together with the apparatus which I now consider to represent the best embodiment thereof; but I desire to have it understood that the apparatus shown and described is only illustrative and that the invention may be carried out by other means.

What I claim as new and desire to protect by Letters Patent of the United States is:

1. A temperature responsive device comprising a pair of spaced electrodes forming therebetween an ionization air gap and a control electrode located between and spaced from the electrodes of said pair, all of said electrodes being insulated from each other.

2. Temperature responsive apparatus comprising a three-electrode thermionic ionization device, the electrodes being insulated from each other and exposed to the atmosphere, an electric circuit containing a source of supply and a current responsive device connected between the outer two of said electrodes and circuit connections for producing a control voltage on the intermediate electrode.

In witness whereof I have hereunto set my hand this 26th day of November, 1930.

FREDRICK S. MARCELLUS.